Jan. 20, 1942.                H. NUTT                2,270,467
FRICTION CLUTCH
Filed June 13, 1939
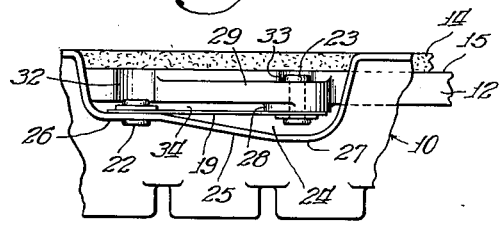
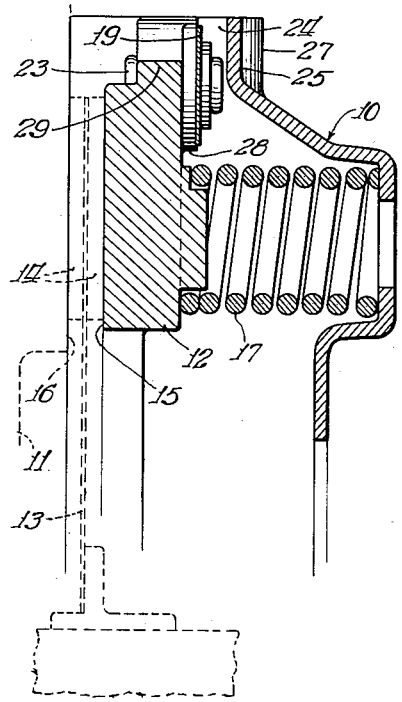
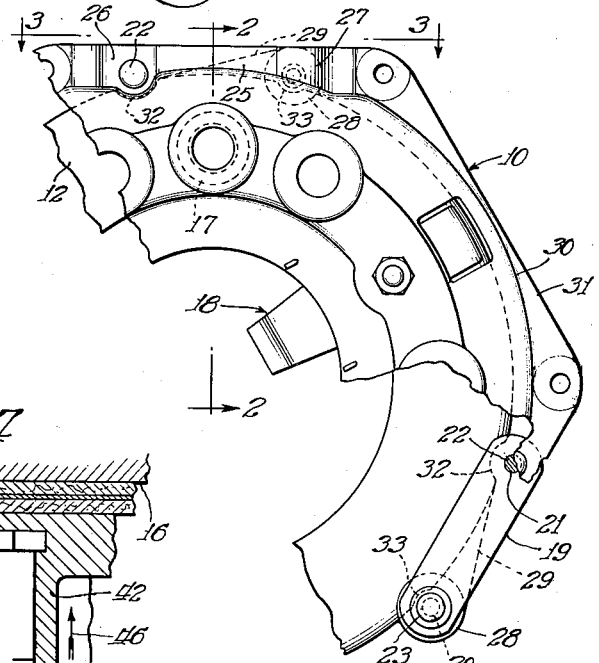
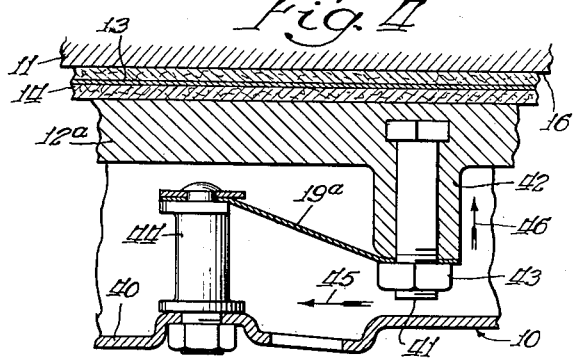
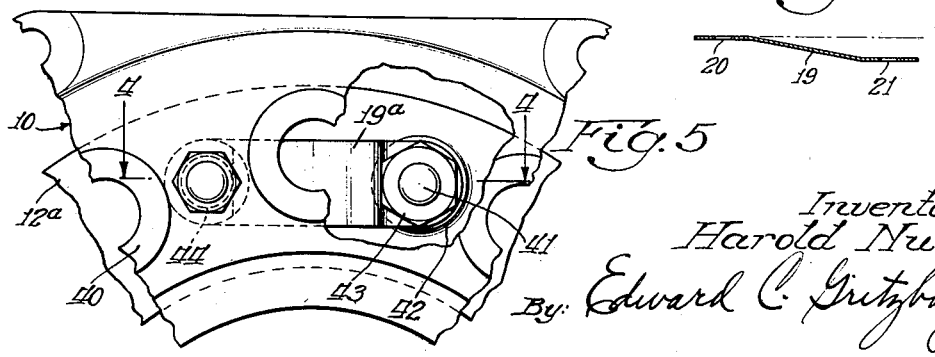
Inventor:
Harold Nutt
By Edward C. Gritzbaugh
Atty.

Patented Jan. 20, 1942

2,270,467

UNITED STATES PATENT OFFICE 2,270,467

FRICTION CLUTCH

Harold Nutt, Chicago, Ill., assignor to Borg-Warner Corporation, Chicago, Ill., a corporation of Illinois Application June 13, 1939, Serial No. 278,848

9 Claims. (Cl. 192—68)

This invention relates to friction clutches of the type wherein the drive from the clutch cover to the pressure plate is transmitted through a flexible link, one end of which is secured to the pressure plate and the other end of which is secured to the cover, the flexibility of the link allowing the pressure plate to move axially in order to effect clutch engagement. One of the objects of the invention is to provide a clutch embodying an improved drive of this type, wherein the link is arranged in such a manner that it will transmit maximum torque without bending or buckling under the driving strain or as a result of radial expansion of the pressure plate under heat developed by the friction faces.

To this end, the invention contemplates, in general, the employment of a driving link in the form of a thin flexible metal strap, of spring steel or the like, arranged in a chordal position with respect to a circumference of the axis of rotation, with its leading end attached to the driving member and its trailing end attached to the pressure plate so that the drive is transmitted through it in the form of a straight chordal pull along its longitudinal axis. It has previously been proposed to provide a drive for the pressure plate of a clutch, in the form of a flexible plate attached at one end to the clutch cover and at its other end to the pressure plate. In such prior devices, however, the line of connection between the cover and the pressure plate has been non-chordal i. e. either radial or tangential. In a single instance of which I am aware, wherein the driving link was disposed tangentially, it was positioned exteriorly of the clutch entirely, and was connected to the pressure plate by means of a post extending through openings in several of the clutch members, an arrangement which is considerably more complicated and expensive, and less satisfactory in operation than that of the present invention owing to the necessity for employing the post construction and the fact that considerable leverage is developed by the post under the pull of the driving link, tending to distort the pressure plate and to pull the post from its anchoring connection with the pressure plate. Furthermore, the transmission of the load through a tangentially arranged driving link sets up undesirable radial components which the present invention eliminates.

The invention contemplates a flexible drive construction which combines maximum torque transmitting strength with maximum simplicity and minimum cost of construction. This is accomplished by locating the flexible drive links between the clutch cover and the pressure plate. Thus the necessity for a post of considerably axial length, for connecting the link to the pressure plate, is eliminated and the attaching means may be in the simple and inexpensive form of rivets. In addition, the link may be brought into direct contact with both the pressure plate and the cover, eliminating the axially extending connection between the link and the pressure plate, and thereby forming a direct straight line connection between the cover and the pressure plate which is unyielding in a circumferential direction and therefore particularly adapted to withstand the high torque loads of acceleration.

The invention further aims to provide an arrangement wherein the flexible drive is located so that it does not interfere with any of the other elements of the clutch and does not require any increase in any dimension thereof, particularly in its over-all axial depth.

In prior clutches incorporating a flexible drive link, it has been customary to locate the link in an area coextensive with at least a portion of the friction surface of the pressure plate, and to attach it to the pressure plate by means of a screw threaded into the pressure plate or a bolt extending through the pressure plate. Either of these constructions have involved forming an opening in the friction surface of the pressure plate, the edges of which tend to scrape against the friction facing of the driven element in an undesirable manner. The invention aims to provide a flexible drive link which is so located and attached to the pressure plate that it does not materially interrupt the friction surface thereof.

Another object of the invention is to provide a clutch having a flexible drive link which does not weaken the cover of the clutch to any appreciable extent.

The latter objects are carried out in the preferred form of the invention by arranging the flexible drive link beyond the outline of the friction surface of the pressure plate, between the pressure plate and the cover, and riveting or otherwise securely fastening the respective ends of the link directly to an inner or forward surface of the cover, and to the rear surface of a portion of the pressure plate which projects beyond the outline of the friction face, respectively.

Another object of the invention is to provide a clutch wherein the cover is formed with arched regions providing, between it and the flywheel of the clutch, a plurality of ventilating openings for inducing a circulation of cooling air through the clutch, in combination with flexible drive links accommodated in said openings and utilizing the opening forming regions of the cover as the means for attaching the link at one end to the cover, thereby simplifying the construction of the clutch and avoiding the increasing of any dimension of the clutch for the accommodation of the drive links.

Another object of the invention is to provide a flexible drive arrangement which is adapted to set up axial thrust between the cover and pressure plate, to either increase or decrease the packing pressure of the pressure plate under the action of the clutch engaging means, as may be desired.

Other objects, the advantages and uses of the invention will become more apparent after reading the following specification and claims, and after consideration of the drawing forming a part of the specification, wherein:

Figure 1 is a rear elevation of a portion of a clutch embodying the invention;

Figure 2 is a vertical sectional view of the same taken as indicated by the line 2—2 of Figure 1;

Figure 3 is a plan view of the same taken as indicated by the line 3—3 of Figure 1;

Figure 4 is a chordal sectional view of a modified form of the invention taken as indicated by the line 4—4 of Figure 5;

Figure 5 is a fragmentary rear elevation of the form shown in Figure 4; and

Figure 6 is a view of the driving link in its unstressed form.

As an illustration of one form in which the invention may be embodied, I have shown in Figures 1, 2 and 3 of the drawing a friction clutch of the general type employed in motor vehicles, including a cover 10 adapted to be attached to the flywheel 11 of the vehicle engine, a pressure plate 12, and a driven element 13 having friction facings 14 adapted to be engaged between the friction faces 15 and 16 of the pressure plate and flywheel plate respectively. Pressure springs 17, engaged between the cover 10 and the pressure plate 12, furnish the pressure for clutch engagement. The clutch may be released by conventional release lever mechanism, such release lever mechanism being adapted to interact between the pressure plate and the cover 10.

The present invention provides a driving connection between the cover and the pressure plate in the form of a thin flat strap 19, preferably of spring steel, secured to the cover 10 and pressure plate 12 respectively by rivets 22 and 23.

In the preferred form of the invention, a drive link is accommodated in each of a series of ventilating openings 24 which are formed between the arched regions 25 of the cover and the flywheel 11. Each rivet 22 is mounted on a flat stepped region 26 of a respective arch 25, parallel to the plane of the friction faces, and located at one end of the arch. Toward its other end, the arch 25 extends rearwardly to a high region 27 which is spaced from the head of the rivet 23, so as to give ample room for the pressure plate to move rearwardly in the releasing of the clutch.

The rivet 23 is mounted in a boss 28 forming the end extremity of an ear 29 rising tangentially from the periphery of the pressure plate. The rear face of the ear 29 is approximately flush with the rear face of the pressure plate, and the forward face of the ear 29 is recessed rearwardly from the friction face of the pressure plate, so as to allow the forward head of the rivet 23 to be accommodated rearwardly of the plane of the friction face.

The ear 29 projects into the ventilating opening 24 from the periphery of the pressure plate which as will be noted from an inspection of Figure 1, is spaced inwardly from the rim region 30 of the cover 10.

The rim portion 30 of the cover, is secured to the flywheel 11 by means of the flange 31. The outer edge of the drive link 19 is disposed substantially flush with the adjacent edge of the flange 31, the inner edge of the drive link overlaps the rear surface of the pressure plate, and the rivets 22 and 23 are located almost wholly beyond the periphery of the pressure plate, slight indentations 32 and 33 being provided in the pressure plate so as to accommodate the rivet heads.

Thus the driving link is arranged so as to leave the friction face of the pressure plate imperforate, and yet is accommodated without any increase in dimension of the cover plate.

The plane of the forward face of the stepped region 26 is spaced rearwardly of the plane of the pressure plate 17 just sufficiently to allow the pressure plate to be retracted without causing the driving link 19 to bind against the tangential edge of the ear 29. The height of the boss 28 is equal to the thickness of the space 34 thus formed between the link 19 and the ear 29, so that the link 19 is positioned in a plane parallel to the plane of the friction faces.

Being positioned chordally with respect to a circumference of axis of rotation, and being secured directly against the cover and the pressure plate respectively, the driving link is adapted to carry a maximum torque load without breaking down, the load being transferred directly from the cover to the pressure plate in a straight line coinciding with the major axis of the driving link.

It may be noted that each driving strap is fastened by a single securing element at each end. This permits the straps to be first attached to one of the members (the pressure plate or the cover) and then adjusted if necessary to the proper positions for attaching to the other member. It also provides a floating support for the pressure plate. That is, the pressure plate is supported and centered by means of the driving straps, and, under expansion caused by heat developed in the operation of the clutch, the pressure plate will simply swing the driving straps outwardly a slight amount, the straps pivoting around the rivets 22 and the pressure plate rotating slightly with reference to the cover in order to compensate for any shortening or lengthening of the circumferential distance between the rivets 22 and 23 which may be caused by such swinging movement of the straps.

In the form of the invention shown in Figures 4 and 5, some of these advantages have been sacrificed in order to secure an axial thrust effect as a resultant of the torque transmitted through the driving link. To this end, the drive link 19a instead of being positioned in a plane parallel to the friction faces, is arranged at an angle to such plane, between the pressure plate and the crown 40 of the cover 10.

The drive link 19a of Figures 4 and 5 is attached at one end to a stud 41 mounted in a boss 42 on the pressure plate, and secured by a nut 43 threaded on the stud 41. The stud 41 is cast into the pressure plate so as not to interrupt the friction face thereof. The other end of the link 19a is attached to the end of a post 44 which is secured to the crown 40 of the cover 10. The direction of rotation being as indicated by the arrow 45, and the link 19a being arranged with its leading end closer to the pressure plate 12a than its trailing end, the torque pull transmitted through the link will develop a component of thrust against the pressure plate 12a as indicated by the arrow 46. Thus the engaging pressure of the clutch may be automatically increased to compensate for increased torque loads if desired. In operation, a clutch constructed in accordance with my invention will receive rotation from the flywheel 11, which will be transmitted through the cover 10 to the forward end of the link 19. Through the link 19, the drive will be transmitted in a straight pull, without radial components, to the periphery of the pressure plate 15. The absence of radial components is achieved by locating the rivets 22 and 23 at the same distance from the axis of rotation i. e. with the line of drive comprising a chord of the common circumference on which the rivets are located.

Radial components increase the load imposed upon the rivets 22 and 23 for a given amount of circumferential pull, and the radial forces which are thus set up between the pressure plate and the cover tend to shift the pressure plate away from the centered relation to the flywheel, particularly if one of the links happens to be a trifle looser than the other.

The link 19 may serve not only as a driving link, but as a retractor spring as well. To this end, it may be preformed with its ends offset in spaced planes as shown in Figure 6, and when assembled, biased to the position shown in Figure 3, under lateral stress tending to move the pressure plate toward disengaged position.

I claim:

1. In a friction clutch, a flywheel and a pressure plate between which a driven plate is adapted to be engaged, a cover attached to the flywheel and enclosing the pressure plate, said cover having in its periphery a ventilating opening defined by a circumferentially and axially arched region, said pressure plate being formed on its periphery with an ear projecting into said opening, and a flexible driving link disposed between said arched region and the pressure plate with one end attached to said arched region and the other end attached to said ear.

2. In a friction clutch, a flywheel and a pressure plate between which a driven plate is adapted to be engaged, a cover attached to the flywheel and enclosing the pressure plate, said cover having in its periphery a ventilating opening defined by a circumferentially and axially arched region, said pressure plate being formed on its periphery with an ear projecting into said opening, and a flexible driving link disposed between said arched region and the pressure plate, substantially chordal to a circumference of the axis of rotation, with its end regions disposed largely beyond the peripheral outline of the friction faces, and with its one end secured to said arched region and its other end secured to the ear.

3. In a friction clutch, a flywheel and a pressure plate between which a driven plate is adapted to be engaged, a cover attached to the flywheel and enclosing the pressure plate, said cover having in its periphery a ventilating opening defined by a circumferentially and axially arched region, and a flexible driving link one end of which is secured to said arched region at a point closer to the plane of the friction faces than the high point of said arch, and the other end of which is attached to the pressure plate beneath said high point and spaced therefrom so as to be free to move axially.

4. In a friction clutch, a flywheel and a pressure plate between which a driven plate is adapted to be engaged, a cover attached to the flywheel and enclosing the pressure plate, said cover having in its periphery a ventilating opening defined by a circumferentially and axially arched region having a portion substantially parallel to the plane of the friction faces and another portion of greater height from said plane than said parallel portion, said pressure plate being formed on its periphery with an ear projecting into said opening, and a flexible driving link substantially parallel to said plane, secured at one end to said parallel portion and at its other end to said ear beneath said higher portion.

5. A friction clutch as defined in claim 1 wherein said link is disposed substantially chordal to a circumference of the axis of rotation and has its end regions located largely beyond the peripheral outline of the friction faces.

6. In a friction clutch, a flywheel and a pressure plate between which a driven plate is adapted to be engaged, a cover attached to the flywheel and enclosing the pressure plate, and at least three driving straps positioned between the cover and the pressure plate, each pivoted at one end to the cover and at its other end to the pressure plate, and arranged substantially chordal to a circumference of the axis of rotation, said straps being freely flexible laterally but non-stretchable longitudinally, said pressure plate being suspended upon and centered by said straps.

7. A friction clutch as defined in claim 6, wherein said straps are attached by means of securing elements extending parallel to the axis of rotation.

8. In a friction clutch, a flywheel and a pressure plate between which a driven plate is adapted to be engaged, a cover attached to the flywheel and enclosing the pressure plate, and at least three driving links positioned between the cover and the pressure plate, each pivoted at one end to the cover and at its other end to the pressure plate, said links being freely flexible laterally but non-stretchable longitudinally and constituting the sole means for supporting and centering said pressure plate.

9. In a friction clutch as defined in claim 8, wherein said pressure plate is in the form of an annular ring and wherein said driving links are adapted to swing about their pivots to accommodate radial expansion and contraction of said ring under varying temperature conditions, while supporting and maintaining the ring centered at all times.

HAROLD NUTT.